United States Patent [19]

Klöpping

[11] Patent Number: 5,007,878
[45] Date of Patent: Apr. 16, 1991

[54] PROCESS FOR CALIBRATION OF STANDARDIZATION OF NATURAL INTESTINES

[76] Inventor: Peter A. Klöpping, An der Alster 3, D-2000 Hamburg 1, Fed. Rep. of Germany

[21] Appl. No.: 444,874

[22] Filed: Dec. 4, 1989

[30] Foreign Application Priority Data

Dec. 12, 1988 [DE] Fed. Rep. of Germany ....... 3841808

[51] Int. Cl.$^5$ .............................................. A22C 11/00
[52] U.S. Cl. ...................................... 452/198; 452/21; 206/802; 426/138
[58] Field of Search ............................ 17/1 R, 49, 1 F; 138/118.1; 206/802; 426/138, 140; 53/581; 452/198, 21

[56] References Cited

U.S. PATENT DOCUMENTS

| 3,528,825 | 9/1970 | Doughty | 206/802 |
| 4,233,341 | 11/1980 | Hammer et al. | 206/802 |
| 4,371,554 | 2/1983 | Becker | 17/1 F |
| 4,379,356 | 4/1983 | Geissbühler | 17/1 F |
| 4,437,206 | 3/1984 | Becker | 17/1 F |
| 4,476,609 | 10/1984 | Loudin | 17/1 R |
| 4,624,873 | 11/1986 | DeJong et al. | 206/802 |
| 4,818,551 | 4/1989 | Stall et al. | 426/138 |
| 4,897,295 | 1/1990 | Erk et al. | 206/802 |

*Primary Examiner*—Willis Little
*Attorney, Agent, or Firm*—Lane, Aitken & McCann

[57] ABSTRACT

The invention relates to a process for calibration or standardization of natural intestines for use as skins for foods or the like, and sausage in particular. A previously desalted natural intestine is subjected over a period of several minutes to an alternating electromagnetic field of less than 20 cm, preferably a microwave field, on a carrier of the desired caliber and of nonpolar material or essentially nonpolar material in comparison to that of the natural intestine.

5 Claims, No Drawings

PROCESS FOR CALIBRATION OF STANDARDIZATION OF NATURAL INTESTINES

The invention relates to a process for calibration and standardization of natural intestines for use as skins for foods and the like, and for sausage in particular.

Natural intestines are intrinsically irregular in shape, that is to say, when viewed along its length a natural intestine is seen to depart widely from the ideal shape of a geometric cylinder. This fact has long been known and previoulsy has been dealt with in two ways. Either this irregular shape has simply been accepted, so that the finished product, as for example, a sausage, has also been very irregular inshape, or as part of a process designated as calibration of natural intestines, an effort has been made to produce regular cylinders from irregularly shaped natural intestines, so that a more or less cylindrical shape has also been imparted to the end product, i.e., a sausage.

In this connection the natural intestine has not been used directly as a tubular skin. It has rather been cut open and subdivided into rectangular strips, and these strips have been sewn together to form cylindrical skins. This has led to the problem that the seams themselves have not been sufficiently tight, with the result that the mass of the sausage could force its way through the seams during the preparation of cooked sausage.

DE-OS (German Patent Disclosure) 28 48 987 concerns itself with this consequent problem in an attempt to arrive at optimum calibration of natural intestines, proposing that the seams of intestinal sections sewn together be sealed by means of a consumable sealing compound.

In another state-of-the-art process (DE-OS 32 16 340), uniform sausage skins are produced by introducing into the natural intestinal skins a calibrated artificial intestine made of an edible tissue. The uniform caliber of the natural intestine is then retained in the finished product, the artificial intestine being stretched to its predetermined diameter when filled with the bulk of the sausage.

Heating a food skin with high-frequency energy before storage is known in connection with the storage of food skins of native cellulose (DE-OS 29 26 590). This achieves the requisite freedom from germs. Heating of pieces of natural intestine is also known in another context (drying), but such heating could not be applied to calibrate pieces of natural intestine.

The object of the invention is to solve the problem of calibrating and standardizing pieces of natural intestine. The characteristics set forth in the patent claim solve this problem.

A change in the structure and adaptation of the shape of the carrier, which shape is permanent, is achieved by heating the wall of the natural intestinal skin, in consequence of movement of molecules through the microwave field. Preferred frequencies are in the range between 300 and 1 GHz. The piece of natural intestine as a result assumes the shape or caliber of the carrier, and does so over its entire length.

Hence it is also possible to connect individual pieces of intestine together to form an endless tube and, it is claimed for the invention, to treat this endless tube so that an endless tube of constant caliber over the entire extent of the tube is produced.

The process claimed for the invention may also be applied for the manufacture of condoms.

In a special process claimed for the present invention, a microwave generator power of 500 watts is employed for pieces of natural intestine of ordinary length. The pieces of natural intestine are first made free of salt and are subjected for approximately 10 minutes on a carrier to microwave energy. A static process may be applied, but it is also possible to apply a continuous process in which the carrier holding the piece of a natural intestine is moved at constant speed by a suitably-shaped source of microwave energy.

Nonpolar materials, as for example glass or polyolefin plastics, are highly suitable as carriers. Antiadhesive agents, as for example vegetable oils, glycrine, fatty acids, or silicone fluid, or intermediate layers between the carrier and the piece of natural intestine, may be applied after the thermal shaping process is carried out to make it easier to remove the contracted piece of natural intestine from the carrier. Polyolefin plastics are suitable as materials for the intermediate layer.

Diameters approximately 4 mm to 12 mm below that of the desired caliber are suitable as dimensions for the carrier.

It is also possible to use a carrier of a shape different from the cylindrical. The coresponding shape is imparted to the piece of natural intestine in this case.

The process claimed for the invention may also be carried out in direct association with the sausage stuffing, by using the nozzle of the sausage stuffer as a carrier and by contracting the pieces of natural intestine on the nozzle by means of microwave energy and drawing them over the mass of sausage emerging from the nozzle.

I claim:

1. A process for the calibration or standardization of natural intestines for use as skins for foods and the like, comprising:
    placing the natural intestines around a carrier having a desired caliber; and
    subjecting the natural intestines to a microwave field.
2. The process according to claim 1 wherein the microwave field comprises microwaves having a wavelength of less than 10 centimeters.
3. The process according to claim 1 wherein the natural intestines are subjected to the electromagnetic field for approximately ten minutes.
4. The process according to claim 1, further comprising, prior to the step of subjecting the natural intestines to a microwave field:
    desalting the natural intestines.
5. The process according to claim 1, wherein each intestines is placed on a carrier of nonpolar material.

* * * * *

UNITED STATES PATENT AND TRADEMARK OFFICE
CERTIFICATE OF CORRECTION

PATENT NO. : 5,007,878
DATED : April 16, 1991
INVENTOR(S) : Peter A. Klopping It is certified that error appears in the above-identified patent and that said Letters Patent is hereby corrected as shown below:

Column 2, line 22, "glycrine" should be --glycerine--.

Signed and Sealed this

Eighteenth Day of May, 1993

Attest:

MICHAEL K. KIRK

*Attesting Officer*   Acting Commissioner of Patents and Trademarks